United States Patent
Li et al.

(10) Patent No.: US 12,463,897 B2
(45) Date of Patent: Nov. 4, 2025

(54) PACKET SENDING METHOD, DEVICE, AND SYSTEM

(71) Applicant: HUAWEI TECHNOLOGIES CO., LTD., Shenzhen (CN)

(72) Inventors: Lingshuai Li, Beijing (CN); Yewei Fu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 285 days.

(21) Appl. No.: 18/158,272

(22) Filed: Jan. 23, 2023

(65) Prior Publication Data

US 2023/0164070 A1  May 25, 2023

Related U.S. Application Data

(63) Continuation of application No. PCT/CN2021/106029, filed on Jul. 13, 2021.

(30) Foreign Application Priority Data

Jul. 23, 2020 (CN) .......................... 202010718331.4

(51) Int. Cl.
H04L 45/00 (2022.01)
H04L 9/40 (2022.01)
(Continued)

(52) U.S. Cl.
CPC .......... H04L 45/66 (2013.01); H04L 12/4641 (2013.01); H04L 45/16 (2013.01); H04L 45/28 (2013.01); H04L 63/0272 (2013.01)

(58) Field of Classification Search
None
See application file for complete search history.

(56) References Cited

U.S. PATENT DOCUMENTS 8,514,746 B1 * 8/2013 Goli .................... H04L 41/0672
370/216
8,780,699 B1 * 7/2014 Hasan .................... H04L 45/68
709/224
(Continued)

FOREIGN PATENT DOCUMENTS

CN 102255757 A 11/2011
CN 108574614 A 9/2018
(Continued)

OTHER PUBLICATIONS

Sajassi, et al, BGP MPLS-Based Ethernet VPN, pp. 1-56, February (Year: 2015).*

(Continued)

*Primary Examiner* — Christopher M Crutchfield
(74) *Attorney, Agent, or Firm* — Leydig, Voit & Mayer, Ltd.

(57) ABSTRACT

This application provides a packet sending method, a device, and a system, and belongs to the field of EVPN technologies. In the solutions provided in this application, when a DF device switches from a first PE device to a second PE device due to a fault in a link between the first PE device and a CE device, the first PE device may send a first packet to the second PE device, so that the second PE device forwards the first packet to the CE device. Therefore, the CE device may generate or update a MAC entry in time based on the first packet forwarded by the second PE device, and may send a packet to the second PE device based on the MAC entry. In this way, the second PE device that switches to the DF device may forward the packet from the CE device, so that normal forwarding of uplink traffic sent from the CE device can be ensured, and interruption of the uplink traffic of the CE device can be avoided.

20 Claims, 7 Drawing Sheets

(51) Int. Cl.
  *H04L 12/46*    (2006.01)
  *H04L 45/16*    (2022.01)
  *H04L 45/28*    (2022.01)

(56)             References Cited

U.S. PATENT DOCUMENTS

|   |   |   |   |
|---|---|---|---|
| 9,019,814 B1 | 4/2015 | Mohanty et al. | |
| 2012/0219004 A1* | 8/2012 | Balus | H04L 12/4641 |
| | | | 370/395.53 |
| 2017/0195135 A1* | 7/2017 | Singh | H04L 12/462 |
| 2017/0250904 A1* | 8/2017 | Singarayan | H04L 12/4641 |
| 2018/0048563 A1* | 2/2018 | Sajassi | H04L 69/40 |
| 2019/0052559 A1* | 2/2019 | Velayudhan | H04L 45/28 |

FOREIGN PATENT DOCUMENTS

| | | | |
|---|---|---|---|
| EP | 3211839 A1 | 8/2017 | |
| EP | 3301861 A1 | 4/2018 | |

OTHER PUBLICATIONS

Rhbadan, et al, Framework for Ethernet VPN Designated Forwarder Election Extensibility, pp. 1-32, April (Year: 2019).*
Sajassi, et al, Provider Backbone Bridging Combined with Ethernet VPN, pp. 1-23 (Year: 2015).*
Author Unknown, IEEE 802.1ag, pp. 1-246 (Year: 2007).*

\* cited by examiner

PACKET SENDING METHOD, DEVICE, AND SYSTEM

CROSS-REFERENCE TO RELATED APPLICATIONS

This application is a continuation of International Application No. PCT/CN2021/106029, filed on Jul. 13, 2021, which claims priority to Chinese Patent Application No. 202010718331.4, filed on Jul. 23, 2020. The disclosures of the aforementioned applications are hereby incorporated by reference in their entireties.

TECHNICAL FIELD

This application relates to the field of Ethernet virtual private network (Ethernet virtual private network, EVPN) technologies, and in particular, to a packet sending method, a device, and a system.

BACKGROUND

In EVPN multihoming networking mode, one customer edge (CE) device may be connected to a plurality of provider edge (PE) devices in an EVPN through a plurality of links. That is, the CE can belong to the plurality of PEs. In EVPN multihoming networking mode, one PE device needs to be elected from a plurality of PE devices connected to a same CE as a designated forwarder (DF) device. The DF device is responsible for forwarding a packet from the CE device or a packet to be sent to the CE device, and a PE device other than the DF device cannot forward the packet from the CE device or the packet to be sent to the CE device. When a link between the DF device and the CE device is faulty, a new DF device may be re-elected from the plurality of PE devices.

In a related technology, if a CE device supports the connectivity fault management (CFM) protocol, when the CE device cannot receive a packet from a DF device due to a fault in a link between the DF device and the CE device, the CE device may sense the link fault in time based on the CFM protocol, to clear a MAC entry on a faulty interface, and send, in a broadcast manner, packets to a plurality of PEs connected to the CE device. Therefore, a new DF device may receive and forward the packets from the CE device, to avoid interruption of uplink traffic of the CE device.

In a scenario in which a CE device does not support the CFM protocol, a link between a DF device and the CE device is faulty, and the CE device cannot receive a packet from a network side, if a new DF device does not forward a packet to the CE device, and the CE device does not refresh a MAC entry of the CE device, the CE device continues to send a packet to the original DF device. As a result, uplink traffic of the CE device is interrupted.

SUMMARY

This application provides a packet sending method, a device, and a system, to resolve a technical problem that uplink traffic is interrupted because a CE device that does not support the CFM protocol cannot sense a link fault in time in a related technology.

According to an aspect, a packet sending method is provided. The method includes: after determining that a designated forwarder DF device switches from a first PE device to a second PE device, the first PE device sends a first packet to the second PE device, to indicate the second PE device to forward the first packet to a CE device, where the second PE device and the first PE device are connected to the same CE device, and a source media access control (MAC) address of the first packet is a MAC address that is of a destination network device and that is learned by the first PE device.

The CE device may generate or update a MAC entry in time after receiving the first packet forwarded by the second PE device, and send, to the second PE device based on the MAC entry, a packet to be sent to the destination network device. In this way, the second PE device that switches to the DF device may forward the packet from the CE device, so that normal forwarding of uplink traffic sent from the CE device can be ensured, and interruption of the uplink traffic of the CE device can be avoided. Specifically, after receiving the first packet, the CE device may determine, based on the first packet, that the packet can be sent to the destination network device through a port for connecting the CE device and the second PE device. The destination network device may be a CE device connected to a remote PE device, user equipment mounted to the CE device connected to the remote PE device, or the like.

Optionally, after the first PE device sends the first packet to the second PE device, the first PE device may further send a second packet to the CE device after determining that the DF device switches from the second PE device back to the first PE device, where a source MAC address of the second packet is the MAC address of the destination network device.

After receiving the second packet sent by the first PE, the CE device may generate or update a MAC entry in time, and send a packet to the first PE device based on the MAC entry. In this way, the first PE device that switches back to the DF device may forward, to the destination network device, the packet from the CE device, so that normal forwarding of uplink traffic sent from the CE device can be ensured, and interruption of the uplink traffic of the CE device can be avoided.

Optionally, the first packet does not include an Ethernet segment identifier (Ethernet segment identifier, ESI); or the first packet includes an ESI, a value of the ESI is a special value different from an ESI of a target Ethernet segment, and the target Ethernet segment is an Ethernet segment to which a link between the first PE device and the CE device belongs.

Based on the foregoing two manners, it can be avoided that the second PE device does not forward the first packet to the CE device due to a split horizon mechanism. That is, it can be ensured that the second PE can forward the first packet to the CE device.

Optionally, the first packet is a broadcast packet, and/or the second packet is a broadcast packet. The first packet is encapsulated into the broadcast packet, and/or the second packet is encapsulated into the broadcast packet, so that it can be ensured that the CE device only generates or updates a MAC entry only based on the broadcast packet, normal service processing of the CE device is not affected, and there is no need to change packet identification and processing behavior of the CE device.

Optionally, the first PE device may send the first packet to the second PE device after preset duration elapses after the DF device switches from the first PE device to the second PE device. After the second PE device switches to the DF device, preparation time is usually needed for packet forwarding. Therefore, the first PE device may wait for the preset duration before sending the first packet, to ensure that the second PE device can successfully send the first packet to another network device in a manner such as broadcast after receiving the first packet.

Optionally, before the first PE device sends the first packet to the second PE device, the method may further include: The first PE device enables, according to an obtained first instruction, a capability of sending the first packet to the second PE device.

Optionally, before the first PE device sends the second packet to the CE device, the method may further include: The first PE device enables, according to an obtained second instruction, a capability of sending the second packet to the CE device.

In this application, either of the first instruction and the second instruction may be configured by operation and maintenance personnel in the first PE device by using a command line, or may be delivered by a control device to the first PE device.

Optionally, the first PE device and the second PE device are devices of different vendors.

In a scenario in which the two PE devices are the devices of the different vendors, only the first PE device may be enabled to obtain the first instruction and the second instruction. That is, only the first PE device is enabled to enable the capabilities of sending the first packet and the second packet, and the second PE device does not need to enable or support the capabilities of sending the first packet and the second packet. Therefore, configuration complexity can be reduced, and it can be ensured, after networking of the first PE device and the second PE device of another different vendor, that the CE device can sense switching of the DF device in time. In a possible specific scenario, for example, the first PE device, as the DF device before a fault occurs, may be a device that supports sending of packets of types of the first packet type and the second packet type, and the second PE device, as a device of the another vendor, may not support sending of the packets of the types of the first packet type and the second packet type.

Optionally, before the first PE device determines that the DF device switches from the first PE device to the second PE device, the method may further include: The first PE device determines that a port that is of the first PE device and that is for connecting to the CE device is faulty; the first PE device determines that a port that is of the first PE device and that is for connecting to another network device is faulty; or the first PE device determines that another network device is faulty, where the another network device is connected to the CE device, and the another network device may be directly or indirectly connected to the CE device. In the foregoing three cases, if only a port that is on a first PE device side and that is for connecting to the CE device or another intermediate network device is faulty, or an intermediate network device is faulty, but a port that is on a CE device side and that is for connecting to the first PE device or another intermediate network devices is not faulty, it may be considered that a single-fiber fault occurs between the first PE device and the CE device.

Based on the foregoing descriptions, it can be learned that the first PE device may trigger switching of the DF device when the single-fiber fault occurs between the first PE device and the CE device. In this case, the CE device cannot sense the single-fiber fault, and can further send a packet to the first PE device. However, according to the solution provided in this application, because the second PE device may forward, to the CE device, the first packet from the first PE device, the CE device may generate or update a MAC entry in time based on the first packet. That is, the CE device may sense switching of the DF device in time based on the first packet, and send a packet or traffic to a remote end via a newly elected DF device.

According to a second aspect, a packet sending method is provided. The method includes: A first PE device determines that a DF device switches from a second PE device to a first PE device, where the second PE device and the first PE device are connected to a same CE device; and sending, by the first PE device, a first packet to the CE device based on a case in which the DF device switches from the second PE device to the first PE device, where a source MAC address of the first packet is a MAC address that is of a destination network device and that is learned by the first PE device.

Similarly, with reference to the descriptions of the technical effects in the previous aspect, it may be learned that, when determining that the DF device switches from the second PE device to the first PE device, the first PE device may directly send the first packet to the CE device, to ensure that the CE device generates or updates a MAC entry in time based on the received first packet, so that normal forwarding of uplink traffic sent from the CE device can be ensured, and interruption of the uplink traffic forwarded by the CE device is avoided.

The first PE device and the second PE device described in the second aspect may also belong to different vendors. In a possible specific scenario, for example, the first PE device, as a standby DF device before a fault occurs, may be a device that supports sending of packets of types of the first packet and a second packet, and the second PE device, as a device of another vendor, may not support sending of the packets of the types of the first packet and the second packet. When a single-fiber fault occurs on a link between the second PE device and the CE device, the first PE device becomes the DF device, and may send the first packet to the CE device based on an enabled corresponding capability.

Optionally, after the first PE device sends the first packet to the CE device, the method may further include: The first PE device determines that the DF device switches from the first PE device back to the second PE device; and the first PE device sends a second packet to the second PE device, where the second packet indicates the second PE device to send the second packet to the CE device, and a source MAC address of the second packet is the MAC address of the destination network device.

Optionally, the second packet does not include an ESI; or the second packet includes an ESI, a value of the ESI is a special value different from an ESI of a target Ethernet segment, and the target Ethernet segment is an Ethernet segment to which a link between the first PE device and the CE device belongs.

Optionally, the first packet is a broadcast packet, and/or the second packet is a broadcast packet.

Optionally, the method may further include: before the first PE device sends the first packet to the CE device, the first PE device enables, according to an obtained first instruction, a capability of sending the first packet to the CE device.

Optionally, the method further includes: before the first PE device sends the second packet to the second PE device, the first PE device enables, according to an obtained second instruction, a capability of sending the second packet to the second PE device.

Optionally, the first PE device and the second PE device are devices of different vendors; or the first PE device and the second PE device are devices of a same vendor.

In a scenario in which the two PE devices are the devices of the same vendor, both the first PE device and the second PE device may be enabled to enable a capability of sending the first packet, and a capability of sending a second packet does not need to be enabled. Therefore, after either of the first PE device and the second PE device switches to the DF device, the DF device may directly send the first packet to the CE device. Because the first packet does not need to be forwarded by the other PE device, efficiency of sending the first packet can be improved, and a network resource occupied in a process of sending the first packet can be reduced.

According to a third aspect, a PE device is provided, the PE device is a first PE device, and the first PE device includes:
 a first determining module, configured to determine that a DF device switches from the first PE device to a second PE device, where the second PE device and the first PE device are connected to a same customer edge CE device; and
 a sending module, configured to send a first packet to the second PE device, to indicate the second PE device to forward the first packet to the CE device, where a source MAC address of the first packet is a MAC address that is of a destination network device and that is learned by the first PE device.

Optionally, the first determining module is further configured to: after the sending module sends the first packet to the second PE device, determine that the DF device switches from the second PE device back to the first PE device.

The sending module is further configured to send a second packet to the CE device, where a source MAC address of the second packet is the MAC address of the destination network device.

Optionally, the first packet does not include an Ethernet segment identifier ESI; or the first packet includes an ESI, a value of the ESI is a special value different from an ESI of a target Ethernet segment, and the target Ethernet segment is an Ethernet segment to which a link between the first PE device and the CE device belongs.

Optionally, the first packet is a broadcast packet, and/or the second packet is a broadcast packet.

Optionally, the sending module is configured to send the first packet to the second PE device after preset duration elapses after the DF device switches from the first PE device to the second PE device.

Optionally, the first PE device further includes:
 an enabling module, configured to: before the sending module sends the first packet to the second PE device, enable, according to an obtained instruction, a capability of sending the first packet to the second PE device.

Optionally, the first PE device and the second PE device are devices of different vendors.

Optionally, the first PE device includes:
 a second determining module, configured to: before the first determining module determines that the DF device switches from the first PE device to the second PE device, determine that a port that is of the first PE device and that is for connecting to the CE device is faulty; determine that a port that is of the first PE device and that is for connecting to another network device is faulty; or determine that another network device is faulty, where the another network device is connected to the CE device.

According to a fourth aspect, a PE device is provided, the PE device is a first PE device, and the first PE device includes:
 a determining module, configured to determine that a DF device switches from a second PE device to a first PE device, where the second PE device and the first PE device are connected to a same customer edge CE device; and
 a sending module, configured to send a first packet to the CE device based on a case in which the DF device switches from the second PE device to the first PE device, where a source MAC address of the first packet is a MAC address that is of a destination network device and that is learned by the first PE device.

Optionally, the determining module is further configured to: after the sending module sends the first packet to the CE device, determine that the DF device switches from the first PE device back to the second PE device.

The sending module is further configured to send a second packet to the second PE device, where the second packet indicates the second PE device to send the second packet to the CE device, and a source MAC address of the second packet is the MAC address of the destination network device.

Optionally, the second packet does not include an Ethernet segment identifier ESI; or the second packet includes an ESI, a value of the ESI is a special value different from an ESI of a target Ethernet segment, and the target Ethernet segment is an Ethernet segment to which a link between the first PE device and the CE device belongs.

Optionally, the first packet is a broadcast packet, and/or the second packet is a broadcast packet.

Optionally, the first PE device further includes:
 a first enabling module, configured to: before the sending module sends the first packet to the CE device, enable, according to an obtained first instruction, a capability of sending the first packet to the CE device.

Optionally, the first PE device further includes:
 a second enabling module, configured to: before the sending module sends the second packet to the second PE device, enable, according to an obtained second instruction, a capability of sending the second packet to the second PE device.

Optionally, the first PE device and the second PE device are devices of different vendors; or the first PE device and the second PE device are devices of a same vendor.

According to a fifth aspect, a PE device is provided, and the PE device includes a memory and a processor. The memory is configured to store a computer program. The processor is configured to execute the computer program stored in the memory, so that the PE device performs the packet sending method provided in any one of the foregoing aspects.

According to a sixth aspect, a computer-readable storage medium is provided. The computer-readable storage medium stores instructions. When the instructions are executed by a processor, the packet sending method provided in any one of the foregoing aspects is implemented.

According to a seventh aspect, a computer program product including instructions is provided. When the computer program product runs on a computer, the computer is enabled to perform the packet sending method provided in any one of the foregoing aspects.

According to an eighth aspect, a communication system is provided, and the system includes a CE device and a first PE device connected to the CE device. The first PE device is the first PE device provided in any one of the foregoing aspects.

Optionally, the communication system further includes one or more other PE devices, and the one or more PE devices and the first PE device jointly serve as multihoming PE devices of the CE device.

In conclusion, this application provides the packet sending method, the device, and the system. When the DF device switches from the first PE device to the second PE device due to the fault in the link between the first PE device and the CE device, the first PE device may send the first packet to the second PE device, so that the second PE device forwards the first packet to the CE device. Therefore, the CE device may generate or update the MAC entry in time based on the first packet forwarded by the second PE device, and may send the packet to the second PE device based on the MAC entry. In this way, the second PE device that switches to the DF device may forward the packet from the CE device, so that normal forwarding of the uplink traffic sent from the CE device can be ensured, and interruption of the uplink traffic of the CE device can be avoided.

DESCRIPTION OF EMBODIMENTS

With reference to the accompanying drawings, the following describes in detail a packet sending method, a device, and a system that are provided in embodiments of this application.

It should be understood that "a plurality of" in this specification means two or more. In descriptions of this application, "/" means "or" unless otherwise specified. For example, A/B may represent A or B. In this specification, "and/or" describes only an association relationship between associated objects and represents that three relationships may exist. For example, A and/or B may represent the following three cases: Only A exists, both A and B exist, and only B exists. In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

Before embodiments of this application are described, an application scenario of embodiments of this application is first described.

EVPN is a layer 2 network interconnection technology that has advantages such as simple deployment and high scalability. In the EVPN, information such as a MAC address of a network device is advertised based on the border gateway protocol (border gateway protocol, BGP), and a layer 2 packet is forwarded based on a generated MAC address entry, to implement layer 2 network interconnection. In addition, the EVPN defines a universal control plane to implement data-plane and control-plane separation. The control plane is responsible for advertising routing information, and a data plane is responsible for forwarding a packet. Assignment is clear, and management is easy.

Figure 1:
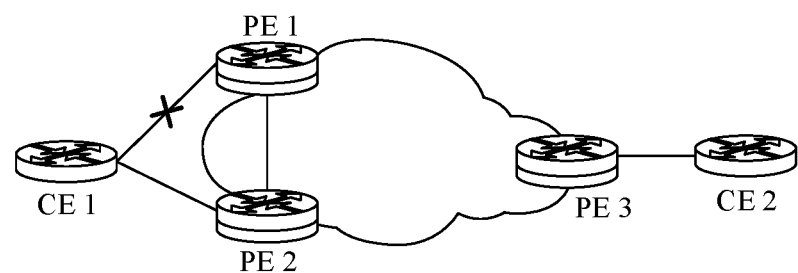
FIG. 1 is a schematic diagram of a structure of an EVPN according to an embodiment of this application.

FIG. 1 is a schematic diagram of a structure of an EVPN according to an embodiment of this application. As shown in FIG. 1, the EVPN may include a plurality of PE devices and a plurality of CE devices. For example, FIG. 1 shows three PE devices, namely, a PE 1, a PE 2, and a PE 3, and two CE devices, namely, a CE 1 and a CE 2. Both the PE devices and the CE devices may be network devices such as routers or switches. For example, the PE devices may be routers, and the CE devices may be switches.

Different CE devices may belong to different virtual extensible local area networks (VXLANs). CE devices belonging to a same VXLAN are located in a same logical layer 2 network and interwork with each other at a layer 2. The CE devices belonging to the different VXLANs are isolated at the layer 2.

In the EVPN, each CE device may establish a communication connection to at least one PE device, and the CE device may be connected to the PE device directly or via another network device (for example, a switch). Each CE device may be further connected to at least one user terminal (terminal). That is, the at least one user terminal may be mounted to the CE device. The user terminal may also be referred to as a host or user equipment, and the user terminal may be a terminal device such as a computer, a wireless terminal device, or a virtual machine (VM) created on a server.

Figure 2:
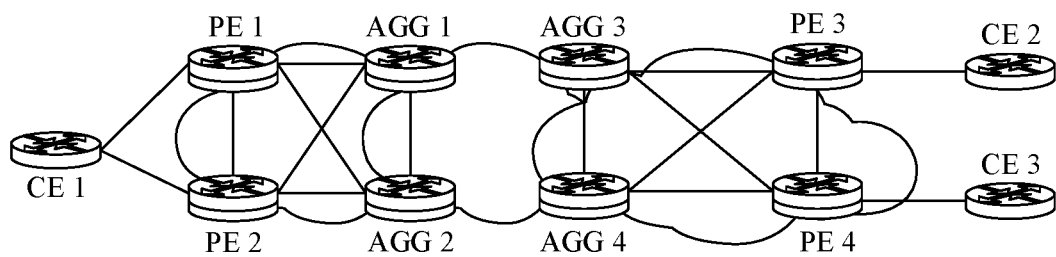
FIG. 2 is a schematic diagram of a structure of another EVPN according to an embodiment of this application.

PE devices may also establish a communication connection with each other, and the PE devices may be connected directly or via another network device (for example, a core device). FIG. 2 is a schematic diagram of a structure of another EVPN according to an embodiment of this application. As shown in FIG. 2, in an Ethernet local area network (E-LAN) or an Ethernet-tree (E-Tree) network, PE devices may be connected through aggregation (AGG) routers. For example, in FIG. 2, a PE 1 may be connected to a PE 3 through an AGG 1, an AGG 2, an AGG 3, and an AGG 4. An Ethernet virtual connection (EVC) sub-interface of each PE device serves as an interface (which may also be referred to as a port) on an access (AC) side, and an EVPN instance in bridge domain (BD) mode is configured for the interface. The AC side is a side that is of the PE device and that is for connecting to a CE device.

Based on a connection mode between a PE device and a CE device, networking types of the EVPN can be classified into two types: CE multihoming and CE single-homing. Refer to FIG. 1 and FIG. 2. A connection form between the CE 2 and the PE 3 and a connection form between a CE 3 and a PE 4 both belongs to the CE single-homing networking type. That is, one CE device is connected to only one PE device. A connection form between the CE 1 and the PEs 1 and 2 belongs to the CE multihoming networking mode. That is, one CE device is connected to a plurality of PE devices. In the CE multihoming networking scenario, each CE device accesses different PE devices through a plurality of links. An Ethernet segment (ES) includes the links. The ES may be uniquely identified by using an ESI. To be specific, ESIs on a plurality of PE devices connected to a same CE device are the same, and ESIs on PE devices connected to different CE devices are different. The ESI may be configured on a physical port that is of the PE device and that is for connecting to the CE device. When an Ethernet segment route is propagated between PE devices, the Ethernet segment route carries an ESI, so that each PE device can sense another PE device connected to a same CE device.

For the CE multihoming networking type, to avoid a network resource waste caused by a case in which one CE device receives repeated traffic from a plurality of PE devices, the EVPN technology introduces a DF device election mechanism. To be specific, a PE device is designated from a plurality of PE devices connected to a same CE device as a DF device. In single-active mode of homing networking, only the DF device can forward a packet from a CE and a packet to be sent to the CE. For example, refer to FIG. 1. If the PE 1 is elected as the DF device, a packet sent from the CE 2 direction is forwarded only from the PE 1 to the CE 1, and only the PE 1 can forward a packet from the CE 1. A PE device that is not elected as the DF device may be referred to as a non-DF device. Alternatively, the PE device that is elected as the DF device may be referred to as a primary DF device, and a PE device that is not elected as the DF device may be referred to as a backup DF device (or a secondary DF device). The single-active mode and a forwarding mechanism in the mode are used as a possible example application scenario, and the solution provided in embodiments of this application may also be used in another possible appropriate application scenario.

If a state of a port that is of a PE device that is for connecting to a CE device is a down state, the PE device becomes the backup DF. If a state of a port that is of a PE device that is for connecting to a CE device is an up state, the PE device and another PE device whose port state is also an up state can jointly elect a primary DF device. An election process may be as follows.

First, after establishing a neighbor relationship, PE devices send Ethernet segment routes to each other, where the Ethernet segment route carries an ESI. Then, each PE device generates a multihoming PE list based on the ESI carried in the Ethernet segment route, where the multihoming PE list includes information about all PE devices connected to a same CE device. In addition, each PE device may obtain an Internet protocol (IP) address of another PE device by using an Ethernet segment route received from the another PE device, sort the PE devices in the multihoming PE list in order of IP address sizes, and sequentially allocate, to the PE devices, sequence numbers starting from 0. Finally, the PE devices may elect a PE device having a smallest IP address as a DF device, or the PE devices may calculate, according to an agreed formula, a sequence number of a PE device elected as a DF device. For example, the formula may be: i=V mod N, where mod represents a modulo operation, i represents the sequence number of the PE device elected as the DF device, N is a quantity of the PE devices multi-homed to the same CE device, namely, a quantity of the PE devices connected to the same CE device, and V represents a VLAN identification (ID) of a VLAN corresponding to an ES.

Because the PE devices elect the DF device according to a same algorithm, the PE devices may determine which PE device is a newly elected DF device. The foregoing DF election process is used as a possible example. During actual application, another possible DF election mechanism may also be used, provided that a new DF device can be determined by using the election mechanism and a necessary network device in a network learns of an up PE device in a manner.

The following explains and describes in detail the packet sending method provided in embodiments of this application.

In embodiments of this application, in single-active mode of CE multihoming networking, for example, in a scenario in which a CE device does not support the CFM protocol, after a plurality of PE devices connected to the CE device re-elect a DF device, an original DF device may send a first packet to the re-elected DF device, to indicate the re-elected DF device to forward the first packet to the CE device, where a source MAC address of the first packet is a MAC address that is of a destination network device and that is learned by the original DF device; or the re-elected DF device may directly send a first packet to the CE device, where a source MAC address of the first packet is a MAC address that is of a destination network device and that is learned by the re-elected DF device.

After receiving the first packet sent by the re-elected DF device, the CE device may generate a MAC entry or update the MAC entry based on the first packet, where a correspondence between the source MAC address of the first packet and a port for receiving the first packet (namely, a port that is of the CE device and that is for connecting to the re-elected DF device) is recorded in the MAC entry. Then, when the CE device needs to send a packet to the destination network device, the CE device may send, based on the correspondence recorded in the MAC entry, the packet to the re-elected DF device through the port for connecting to the re-elected DF device, where the packet may belong to, for example, traffic sent by user equipment connected to the CE device. Therefore, it can be ensured that the CE device can still sense a link fault in time even if a port that is of the CE device and that is for connecting to the DF device that is before the fault occurs is still in an upstate, so that normal forwarding of uplink traffic sent from the CE device is ensured, and interruption of the uplink traffic is avoided.

It may be understood that concepts such as first and second in any one of the following embodiments are independent of concepts such as first and second in other embodiments, and there is not a strict correspondence. For example, a first PE device in an embodiment and a first PE device in another embodiment may not indicate a same PE device. Specific concepts are described in the following embodiments one by one.

Figure 3:
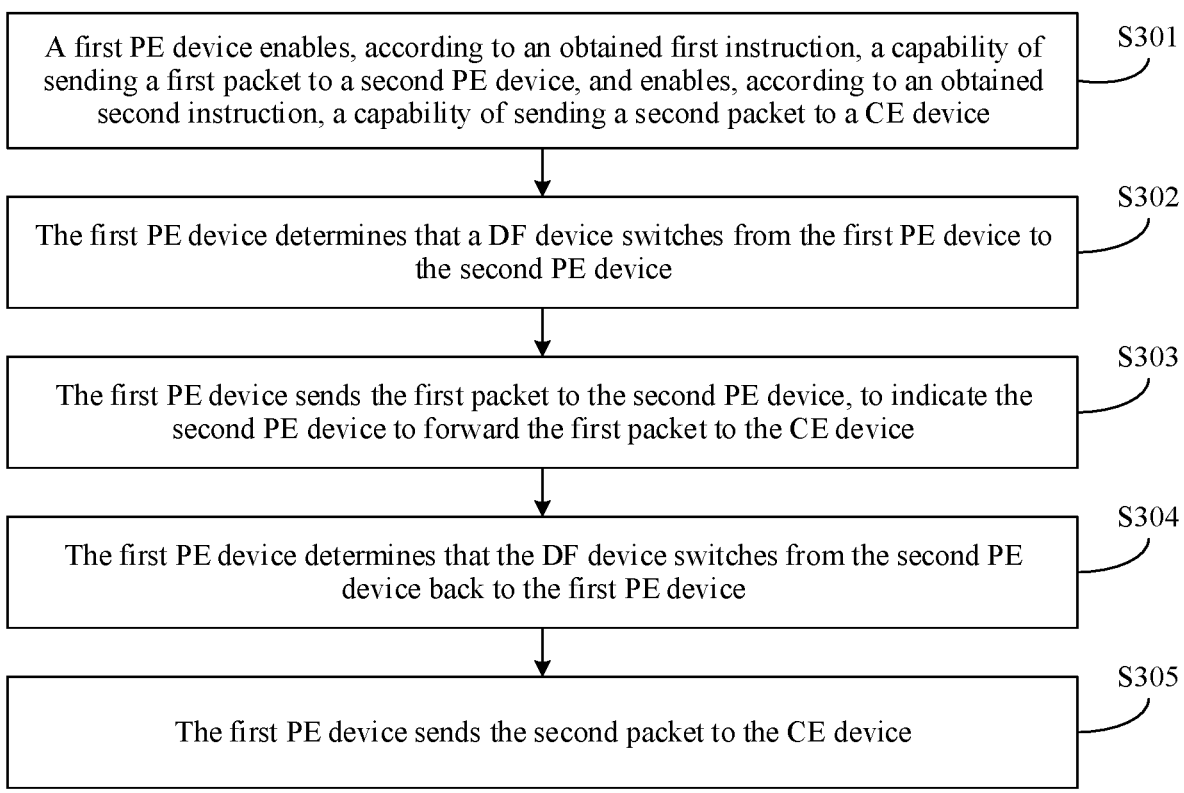
FIG. 3 is a flowchart of a packet sending method according to an embodiment of this application.

FIG. 3 is a flowchart of a packet sending method according to an embodiment of this application. The packet sending method may be applied to a first PE device in an EVPN in CE multihoming networking mode. The EVPN further includes a second PE device, and the first PE device and the second PE device are connected to a same CE device. For example, the first PE device may be the PE 1 shown in FIG. 1 or FIG. 2, and the second PE device may be the PE 2 shown in FIG. 1 or FIG. 2. If a quantity of PE devices connected to the CE device is greater than 2 in CE multihoming networking mode, the first PE device and the second PE device may be any two of the plurality of PE devices connected to the CE device.

Descriptions are provided in the following embodiment by using an example in which the first PE device is a DF device and the second PE device is a non-DF device when a link between the first PE device and the CE device is normal and a link between the second PE device and the CE device is normal. As shown in FIG. 3, the method includes the following steps.

S301: The first PE device enables, according to an obtained first instruction, a capability of sending a first packet to the second PE device, and enables, according to an obtained second instruction, a capability of sending a second packet to the CE device.

That the first PE device enables the capability of sending the first packet to the second PE device means that the first PE device is enabled to have a capability of generating the first packet and sending the first packet to the second PE device after determining that the DF device switches from the first PE device to the second PE device. That the first PE device enables the capability of sending the second packet to the CE device means that the first PE device is enabled to have a capability of generating the second packet and sending the second packet to the CE device after determining that the DF device switches from the second PE device back to the first PE device.

For the first PE device, other PE devices (for example, the PE 3 and the PE 4 in FIG. 2) that is not connected to the same CE device as the first PE device may also be referred to as remote devices of the first PE device, another PE device (for example, the PE 2 in FIG. 2) that is connected to the same CE device as the first PE device may also be referred to as a multihoming device of the first PE device, and the CE device connected to the first PE device may also be referred to as an access side device of the first PE device. Therefore, enabling the capability of sending the first packet to the second PE device may also be referred to as enabling a capability of sending the first packet to the multihoming device, and enabling the capability of sending the second packet to the CE device may also be referred to as enabling a capability of sending the second packet to the access side device.

Optionally, both the first instruction and the second instruction may be configured by operation and maintenance personnel in the first PE device by using a command line. Alternatively, the first instruction and the second instruction may be delivered to the first PE device by a control device (for example, a controller) connected to the first PE device.

For example, the first instruction may be a command line, namely, df-change remote-mac-sender enable, configured by the operation and maintenance personnel in the first PE device, and the second instruction may be a command line, namely, df-change local-mac-sender enable, configured by the operation and maintenance personnel in the first PE device.

In this embodiment of this application, the first PE device and the second PE device may be devices of different vendors. In this scenario, only the first PE device may be enabled to obtain the first instruction and the second instruction, to enable the capability of the first PE device to send the first packet to the multihoming device and the capability of the first PE device to send the second packet to the access side device. However, the second PE device does not need to obtain the first instruction and the second instruction. That is, the second PE device does not have the capability of sending the first packet to the multihoming device and the capability of sending the second packet to the access side device. Because only the capabilities of the first PE device to send the first packet and the second packet need to be enabled, complexity of PE device configuration can be effectively reduced, and a network resource waste caused by enabling the packet sending capabilities of both the first PE device and the second PE device can be avoided. In this scenario, the first PE device is enabled to obtain the first instruction and the second instruction, so that after networking of the first PE device and the second PE device of another different vendor, it can be ensured that the CE device can sense switching of the DF device in time.

In another possible scenario, the first PE device and the second PE device may alternatively be devices of a same vendor. In this scenario, in an optional implementation, only the first PE device may be enabled to obtain the first instruction and the second instruction, and the second PE device does not need to obtain the first instruction and the second instruction. That is, only the first PE device may generate and send the first packet and the second packet, and the second PE device is only configured to forward the first packet. In another optional implementation, both the first PE device and the second PE device may alternatively be enabled to obtain the first instruction and the second instruction. Therefore, the first PE device and the second PE device both can generate and send the first packet, and both can generate and send the second packet.

In this embodiment, an example in which a corresponding capability is pre-configured and enabled, through S301, in the first PE device that is before a fault occurs is used. However, during actual application, an execution occasion of S301 may alternatively be determined with reference to a requirement or a scenario. For example, S301 is executed when the first PE device discovers a link fault or DF re-election is performed. Alternatively, in another possible case, S301 may not be performed, but the first PE device is directly fixed to have a corresponding capability.

S302: The first PE device determines that the DF device switches from the first PE device to the second PE device.

In a scenario in which the first PE device is the DF device and the second PE device is the non-DF device, if the first PE device detects that a link used by the first PE device to send a packet to the CE device is faulty, a DF device re-election procedure may be triggered. To be specific, the first PE device and one or more PE devices including the second PE device may jointly re-elect a new DF device. If the second PE device is elected as the new DF device, the first PE device may determine that the DF device switches from the first PE device to the second PE device. For a DF device re-election process, refer to the foregoing descriptions. Details are not described herein again.

In this embodiment of this application, when detecting that a port for connecting to the CE device is faulty, when detecting that a port that is of the first PE device and that is for connecting to another network device (where the another network device is connected to the CE device) is faulty, or when detecting that another network device is faulty, the first PE device may determine that the link for sending the packet to the CE device is faulty, and trigger the DF device re-election procedure. That is, when the first PE device triggers the DF device re-election process, a link used by the CE device to send a packet to the first PE device may be in a normal state. That is, the fault in the link between the CE device and the first PE device is a single-fiber fault. In this case, a state of a port that is of the CE device and that is for connecting to the first PE device is still an up state, and the CE device can further send the packet to the first PE device.

For example, refer to FIG. 1 and FIG. 2. It is assumed that the CE 1 performs dual-homing access to the PE 1 and the PE 2, the PE 1 is a DF device, and the PE 2 is a non-DF device. Therefore, when detecting a fault in a port for connecting to the CE 1, the PE 1 may trigger a DF device re-election process. If a re-elected DF device is the PE 2, the PE 1 may determine that the DF device switches from the PE 1 to the PE 2.

S303: The first PE device sends the first packet to the second PE device, to indicate the second PE device to forward the first packet to the CE device.

In this embodiment of this application, after the first PE device determines that the DF device switches from the first PE device to the second PE device, the first PE device may generate the first packet, and send the first packet to the second PE device. The second PE device may further forward the first packet to the CE device. A source MAC address of the first packet is a MAC address that is of a destination network device and that is learned by the first PE device from another PE device.

After the CE device receives the first packet forwarded by the second PE device, if the CE device does not store a MAC entry of the source MAC address, the CE device may generate a new MAC entry; or if the CE device has stored a MAC entry of the source MAC address, the CE device may update the MAC entry. In an example, when the CE device deletes the MAC entry of the source MAC address due to aging of the source MAC address, or when a new network device accesses a communication network, a case in which the CE device does not store the MAC entry of the source MAC address occurs. In this case, the CE device needs to generate the new MAC address entry based on the source MAC address.

The generated MAC entry or an updated MAC entry records a correspondence between the source MAC address of the first packet and a port (namely, a port that is of the CE device and that is for connecting to the second PE device) that is of the CE device and that is for receiving the first packet. Then, when the CE device needs to send a packet to the destination network device, the CE device may send, based on the correspondence recorded in the MAC entry, the packet to the second PE device through the port for connecting to the second PE device.

Optionally, the first PE device may learn the MAC address of the destination network device based on a MAC address advertisement route that is sent by another network device and that carries the MAC address of the destination network device. The another PE device may be the second PE device, or may be a third PE device other than the second PE device. For example, refer to FIG. 1 and FIG. 2. The another PE device may be the PE 3 or the PE 4. The destination network device may be a CE device connected to the another PE device, or the destination network device may be a user terminal mounted to a CE device connected to the another PE device. For example, refer to FIG. 1 and FIG. 2. The destination network device may be a user terminal mounted to the CE 2 or the CE 3.

In a scenario in which a quantity of PE devices to which the CE device performs multihoming access is greater than 2, the first PE device may send the first packet to only the second PE device (namely, the newly elected DF device). Alternatively, the first PE device may send the first packet to each of other PE devices to which the CE device performs multihoming access. In a possible actual application scenario, after another PE device receives the first packet, because only the second PE device as the newly elected DF can forward the first packet to the CE device, a PE device other than the second PE device may directly discard the first packet.

In CE multihoming networking mode, after receiving broadcast, unknown unicast, and multicast (broadcast, unknown unicast, and multicast, BUM) packets sent by the CE device, the first PE device may forward the BUM packets to the second PE device connected to the CE device. To avoid a loop formed because the second PE device continues to forward the BUM packets to the CE device, a split horizon mechanism is defined in the EVPN. To be specific, after receiving the BUM packets sent by the first PE device, the second PE device detects an ESI in the BUM packets. If the ESI in the BUM packets is the same as a target ESI, the second PE device does not forward the BUM packets to the CE device, to avoid forming the loop. The target ESI is an ESI of an ES to which the link between the second PE device and the CE device belongs. Because a plurality of PE devices connected to a same CE device may be referred to as a redundancy backup group, the split horizon mechanism may also be understood as follows: After receiving BUM packets forwarded by another PE device in a same redundancy backup group, a PE device does not forward the BUM packets to an ES having a same ESI.

In this embodiment of this application, to prevent the second PE device, as a PE device whose split horizon capability is enabled, from skipping, according to the split horizon mechanism after receiving the first packet sent by the first PE device, forwarding the first packet to the CE device, the first packet may not include an ESI. Alternatively, the first packet includes an ESI, and a value of the ESI is a special value different from an ESI of a target Ethernet segment. The target Ethernet segment is an Ethernet segment to which the link between the first PE device and the CE device belongs. For example, the special value may be 0.

In the foregoing two manners, it can be ensured that the second PE device can normally forward the first packet to the CE device after receiving the first packet sent by the first PE device.

Figure 4:
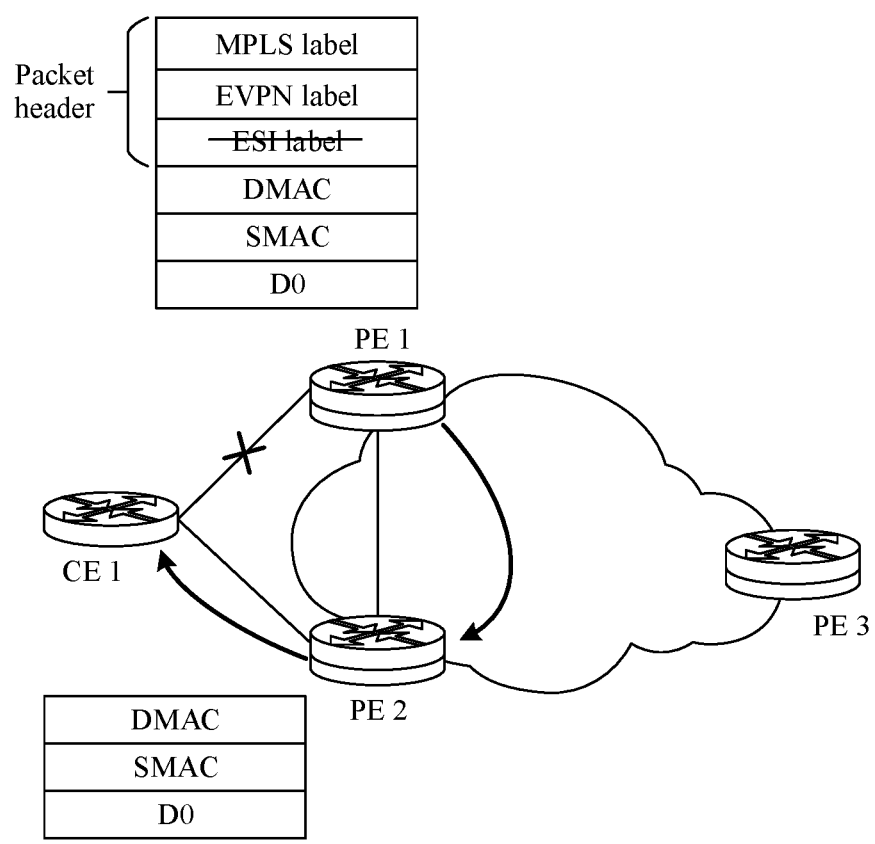
FIG. 4 is a schematic diagram of a first packet according to an embodiment of this application.
Figure 5:
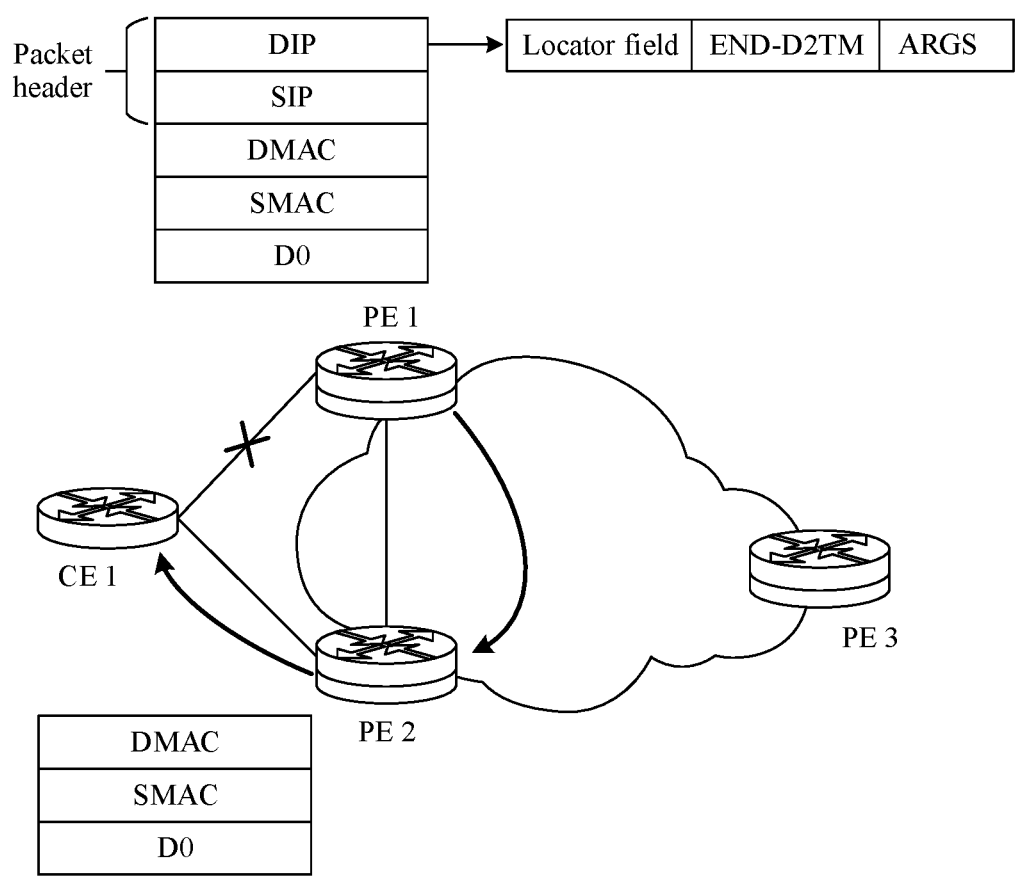
FIG. 5 is a schematic diagram of another first packet according to an embodiment of this application.

In the EVPN, a tunnel may be established between the first PE device and the second PE device, and the first PE device may send the first packet to the second PE device through the tunnel. As shown in FIG. 4 and FIG. 5, the first packet may include a packet header, a source MAC (SMAC) field for carrying a source MAC address, a destination MAC (DMAC) field for carrying a destination MAC address, and a data field D0. The packet header may also be referred to as a tunnel header.

After receiving the first packet, the second PE device may decapsulate the first packet, remove the packet header, and then send, to the CE device, a first packet obtained by removing the packet header. For example, refer to FIG. 4 and FIG. 5. A PE 1 may send the first packet to a PE 2. After receiving the first packet, the PE 2 may remove the packet header from the first packet, and forward, to the CE 1, the first packet obtained through removing the packet header.

In an optional implementation, the tunnel between the first PE and the second PE is a multiprotocol label switching (MPLS) protocol tunnel. In this case, the first PE device may encapsulate the first packet according to the MPLS protocol. As shown in FIG. 4, the packet header of the first packet encapsulated based on the MPLS protocol may include an MPLS label and an EVPN label, and the packet header does not include an ESI label for carrying an ESI.

In another optional implementation, the tunnel between the first PE and the second PE is an SRv6 protocol tunnel. SRv6 is a network bearer protocol in which a segment routing (SR) technology and an Internet protocol version 6 (IPv6) are combined. As shown in FIG. 5, the packet header of the first packet encapsulated based on the SRv6 protocol includes a destination IP field DIP for carrying a destination IPv6 address and a source IP field SIP for carrying a source IPv6 address. The DIP includes a locator field, an END-D2TM field, and an arguments (ARGS) field. The locator field is for carrying a routing prefix of the second PE device. The END-D2TM field is for identifying a service type. To be specific, the END-D2TM field identifies a specific VPN and a specific service type. The ARGS field is for carrying ESI information. In this embodiment of this application, the ARGS field may be filled with a special value different from the ESI of the target Ethernet segment. For example, the special value may be 0. END-D2TM represents a layer 2 cross-connection endpoint segment identifier (SID) for performing broadcast flooding.

In this embodiment of this application, the first packet may be a broadcast packet. Optionally, each bit in a DMAC field in the broadcast packet may be filled with a hexadecimal number F. That is, a destination MAC address of the first packet may be all-F. The first packet is encapsulated into the broadcast packet, so that the CE device receives the broadcast packet, and can discard the broadcast packet after updating the MAC entry based on the broadcast packet, impact on normal service processing of the CE device is avoided, and there is no need to change packet identification and processing behavior of the CE device.

In addition, the data field D0 in the first packet may also be filled with any value. For example, the data field D0 may be all filled with 0.

After the DF device switches from the first PE device to the second PE device, a hardware layer of the second PE device usually needs preparation time to refresh an entry of the second PE device, and then can support forwarding of the first packet to the CE device. Therefore, the first PE device may send the first packet to the second PE device after preset duration elapses after the DF device switches from the first PE device to the second PE device, to ensure that the second PE device can successfully send the first packet to another network device in a manner such as broadcast after receiving the first packet. The preset duration may be fixed duration prestored in the first PE device. In addition, the preset duration may be configured by operation and maintenance personnel by using a command line, or may be delivered by a control device to the first PE device. For example, assuming that the preset duration is T0, the operation and maintenance personnel may configure the following command line in the first PE device: df-change remote-mac-sender delay-time T0.

In this embodiment of this application, to prevent sending of the first packet from affecting sending of another service packet, the first PE device may send the first packet at a preset rate. The preset rate may be configured by operation and maintenance personnel by using a command line, or may be delivered by the control device to the first PE device. For example, assuming that the preset rate is X0, the operation and maintenance personnel may configure the following command line in the first PE device: df-change send-packet rate X0.

S304: The first PE device determines that the DF device switches from the second PE device back to the first PE device.

In this embodiment of this application, after detecting that the fault in the link between the first PE device and the CE device is recovered, the first PE device may trigger a DF device re-election procedure again. After the first PE device and the second PE device re-elect the DF device, the DF device may switch from the second PE device back to the first PE device.

For example, with reference to FIG. 1, FIG. 2, FIG. 3, and FIG. 4, after a fault in a link between the PE 1 and the CE 1 is recovered, the DF device may switch from the PE 2 back to the PE 1.

S305: The first PE device sends the second packet to the CE device.

After determining that the DF device switches from the second PE device back to the first PE device, the first PE device may generate the second packet. A source MAC address of the second packet is the MAC address that is of the destination network device and that is learned by the first PE device. Because the first PE device has switched to the DF device, the first PE device may directly send the second packet to the CE device.

After receiving the second packet sent by the first PE device, the CE device may generate or update a MAC entry based on the source MAC address of the second packet. The generated MAC entry or an updated MAC entry records a correspondence between the source MAC address of the second packet and a port (namely, a port that is of the CE device and that is for connecting to the first PE device) that is of the CE device and that is for receiving the second packet. Then, when the CE device needs to send a packet to the destination network device, the CE device may send, to the first PE device through the port for connecting to the first PE device and based on the correspondence recorded in the MAC entry, the packet that needs to be sent to the destination network device.

Optionally, the second packet may also be a broadcast packet. For example, a destination MAC address of the second packet may be all-F.

Optionally, in this embodiment of this application, to prevent the first PE device from repeatedly sending the first packet and/or the second packet due to repeated DF device switching caused by repeated flapping of a link on an AC side, link flapping damp (damp interface) may be further configured on an interface on the AC side of the first PE device. The first PE device can avoid, based on the link flapping damp, frequently triggering a DF device re-election procedure.

In conclusion, this embodiment of this application provides the packet sending method. After determining that the DF device switches to the second PE device, the first PE device may send the first packet to the second PE device, so that the second PE device can forward the first packet to the CE device connected to the two PE devices jointly. Therefore, the CE device may generate or update the MAC entry in time based on the first packet forwarded by the second PE device, and may send the packet to the second PE device based on the MAC entry. In this way, the second PE device that switches to the DF device may forward the packet from the CE device, so that normal forwarding of uplink traffic sent from the CE device can be ensured, and interruption of the uplink traffic of the CE device can be avoided.

Figure 6:
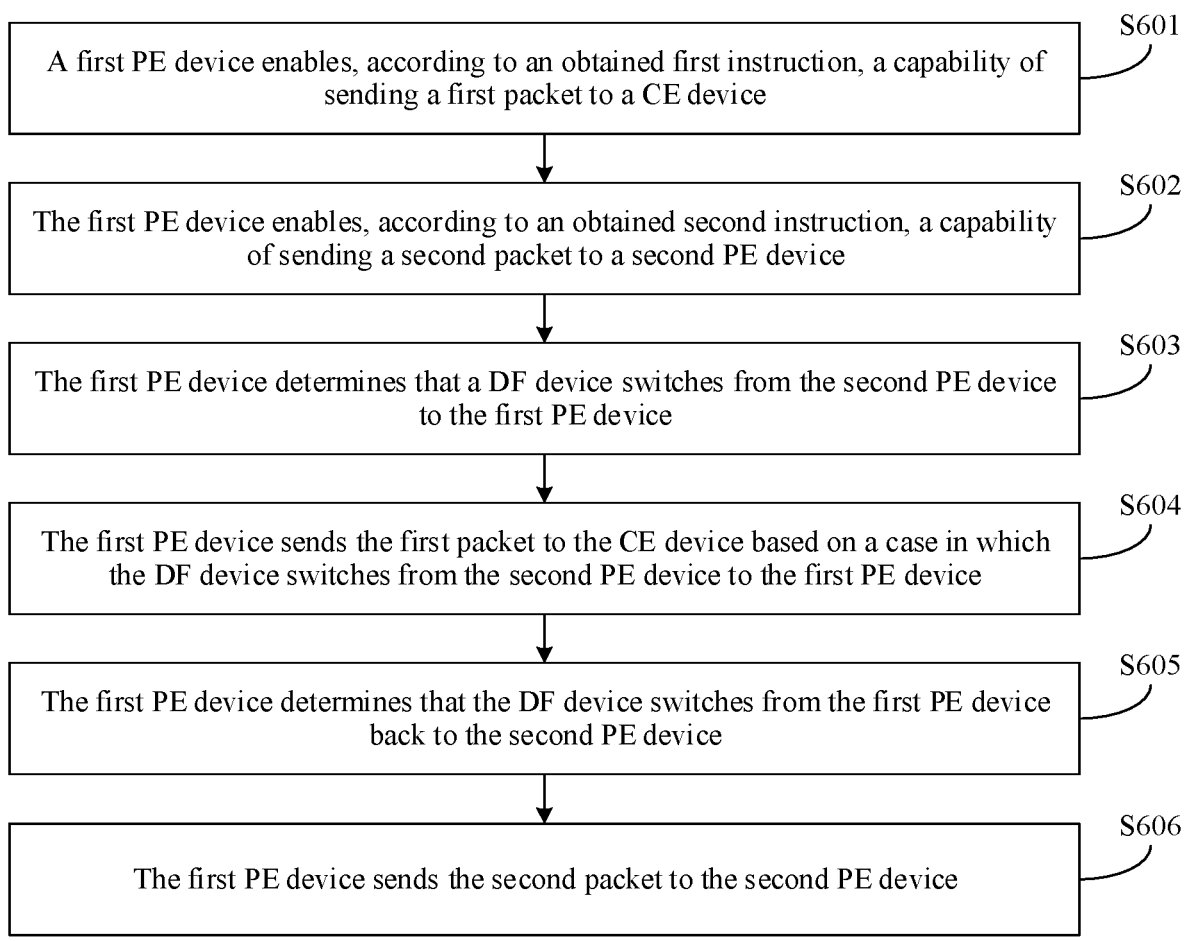
FIG. 6 is a flowchart of another packet sending method according to an embodiment of this application.

FIG. 6 is a flowchart of another packet sending method according to an embodiment of this application. The packet sending method may be applied to a first PE device in an EVPN in CE multihoming networking mode. The EVPN further includes a second PE device. The first PE device and the second PE device are connected to a same CE device. For example, the first PE device may be the PE 2 shown in FIG. 1 or FIG. 2, and the second PE device may be the PE 1 shown in FIG. 1 or FIG. 2. If a quantity of PE devices connected to the CE device is greater than 2 in CE multihoming networking mode, the first PE device and the second PE device may be any two of the plurality of PE devices connected to the CE device.

Descriptions are provided in the following embodiment by using an example in which the second PE device is a DF device when a link between the first PE device and the CE device is normal and a link between the second PE device and the CE device is normal. In addition, vendors to which the first PE device and the second PE device belong are not limited in the following embodiment. To be specific, the first PE device and the second PE device may be devices of a same vendor, or may be devices of different vendors. As shown in FIG. 6, the method includes the following steps.

S601: The first PE device enables, according to an obtained first instruction, a capability of sending a first packet to the CE device.

S602: The first PE device enables, according to an obtained second instruction, a capability of sending a second packet to the second PE device.

For implementation processes of S601 and S602, refer to the related descriptions in S301 in the foregoing embodiment. Details are not described herein again.

S603: The first PE device determines that the DF device switches from the second PE device to the first PE device.

In a scenario in which the second PE device is the DF device and the first PE device is a non-DF device, if the second PE device detects that a link used by the second PE device to send a packet to the CE device is faulty, a DF device re-election procedure may be triggered. After the first PE device and the second PE device re-elect the DF device, the DF device may switch from the second PE device to the first PE device.

Optionally, when detecting that a port for connecting to the CE device is faulty, when detecting that a port that is of the second PE device and that is for connecting to another network device (where the another network device is connected to the CE device) is faulty, or when detecting that another network device is faulty, the second PE device may determine that the link for sending the packet to the CE device is faulty, and then may trigger the DF device re-election procedure.

S604: The first PE device sends the first packet to the CE device based on a case in which the DF device switches from the second PE device to the first PE device.

A source MAC address of the first packet is a MAC address that is of a destination network device and that is learned by the first PE device. Because the first PE device has switched to the DF device, the first PE device may directly send the first packet to the CE device. Optionally, the first packet may be a broadcast packet. For an implementation process of S604, refer to the related descriptions in S305 in the foregoing embodiment. Details are not described herein again.

S605: The first PE device determines that the DF device switches from the first PE device back to the second PE device.

After detecting that the fault in the link between the second PE device and the CE device is recovered, the second PE device may trigger a DF device re-election procedure again. After the first PE device and the second PE device re-elect a DF device, the DF device may switch from the first PE device back to the second PE device.

S606: The first PE device sends the second packet to the second PE device.

After determining that the DF device switches from the first PE device back to the second PE device, the first PE device may generate the second packet, and send the second packet to the second PE device. The second packet indicates the second PE device to send the second packet to the CE device, and a source MAC address of the second packet is the MAC address of the destination network device.

Optionally, the second packet may be a broadcast packet. In addition, to prevent the second PE device from skipping, due to a split horizon mechanism, forwarding the second packet to the CE device, the second packet may not include an ESI. Alternatively, the second packet includes an ESI, a value of the ESI is a special value different from an ESI of a target Ethernet segment, and the target Ethernet segment is an Ethernet segment to which the link between the first PE device and the CE device belongs.

For an implementation process of S606, refer to the related descriptions in S303 in the foregoing embodiment. Details are not described herein again.

In this embodiment of this application, in a scenario in which the first PE device and the second PE device are the devices of the same vendor, S602, S605, and S606 may be deleted based on a situation, and the second PE device may alternatively perform the method shown in S601, S603, and S604. That is, when the first PE device and the second PE device are the devices of the same vendor, both the first PE device and the second PE device may be enabled to obtain the first instruction, so that either PE device can enable the capability of sending the first packet to the CE device. In addition, either PE device does not need to enable a capability of sending the second packet to the other PE device. In this scenario, after either of the first PE device and the second PE device switches to the DF device, the DF device may generate the first packet, and directly send the first packet to the CE device. Because the first packet does not need to be forwarded by the other PE device, efficiency of sending the first packet can be improved, and a network resource occupied in a process of sending the first packet can be reduced.

In the scenario in which the first PE device and the second PE device are the devices of the same vendor, S602, S605, and S606 may alternatively be reserved, and the second PE device may alternatively perform the method shown in S601 to S606. That is, when the first PE device and the second PE device are the devices of the same vendor, both the first PE device and the second PE device may be enabled to obtain the first instruction, and both obtain the second instruction, so that either PE device can enable the capability of sending the first packet to the CE device, and can enable a capability of sending the second packet to the other PE device. Further, after either of the first PE device and the second PE device switches to the DF device, the DF device may generate the first packet, and directly send the first packet to the CE device. The other PE device that switches to a non-DF device may generate the second packet, and send the second packet to the DF device, and then the DF device may forward the second packet to the CE device.

In conclusion, this embodiment of this application provides the packet sending method. After switching to the DF device, the first PE device may send the first packet to the CE device. Therefore, the CE device may generate or update a MAC entry in time based on the first packet forwarded by the first PE device, and may send a packet to the first PE device based on the MAC entry. In this way, the first PE device that switches to the DF device may forward the packet from the CE device, so that normal forwarding of uplink traffic sent from the CE device can be ensured, and interruption of the uplink traffic of the CE device can be avoided.

It may be understood that sequences of the steps of the packet sending methods provided in embodiments of this application may be appropriately adjusted, or steps may be correspondingly added or deleted based on a situation. For example, S304 and S305 may be deleted based on a situation. Alternatively, S602 may be performed before S601. Alternatively, S602, S605, and S606 may be deleted based on the situation.

Figure 7:
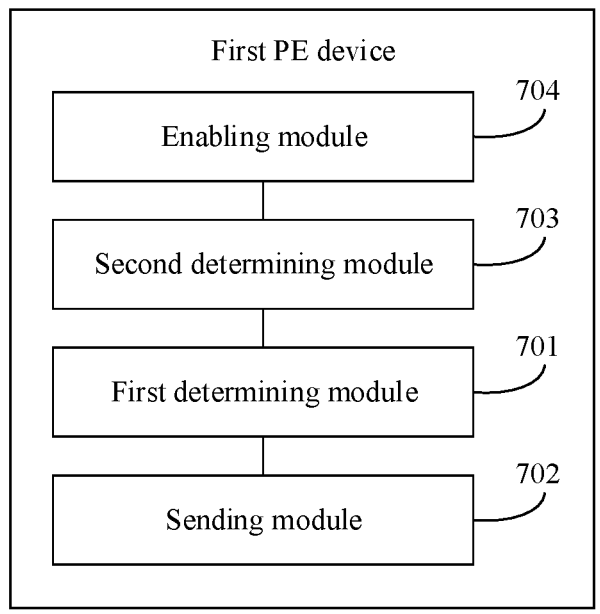
FIG. 7 is a schematic diagram of a structure of a PE device according to an embodiment of this application.

FIG. 7 is a schematic diagram of a structure of a PE device according to an embodiment of this application. The PE device is a first PE device, and the first PE device may be configured to implement the packet sending method in the method embodiment shown in FIG. 3. As shown in FIG. 7, the first PE device includes:
- a first determining module 701, configured to determine that a DF device switches from the first PE device to a second PE device, where the second PE device and the first PE device are connected to a same customer edge CE device, and for function implementation of the first determining module 701, refer to the related descriptions in S302; and
- a sending module 702, configured to send a first packet to the second PE device, to indicate the second PE device to forward the first packet to the CE device, where a source MAC address of the first packet is a MAC address that is of a destination network device and that is learned by the first PE device, and for function implementation of the sending module 702, refer to the related descriptions in S303.

Optionally, the first determining module 701 is further configured to: after the sending module sends the first packet to the second PE device, determine that the DF device switches from the second PE device back to the first PE device, where for function implementation of the first determining module 701, further refer to the related descriptions in S304.

The sending module 702 is further configured to send a second packet to the CE device, where a source MAC address of the second packet is the MAC address of the destination network device, and for function implementation of the sending module 702, further refer to the related descriptions in S305.

Optionally, the first packet does not include an Ethernet segment identifier ESI; or the first packet includes an ESI, a value of the ESI is a special value different from an ESI of a target Ethernet segment, and the target Ethernet segment is an Ethernet segment to which a link between the first PE device and the CE device belongs.

Optionally, the first packet is a broadcast packet, and/or the second packet is a broadcast packet.

Optionally, the sending module 702 is configured to send the first packet to the second PE device after preset duration elapses after the DF device switches from the first PE device to the second PE device.

Optionally, as shown in FIG. 7, the first PE device may further include:
- an enabling module 703, configured to: before the sending module sends the first packet to the second PE device, enable, according to an obtained instruction, a capability of sending the first packet to the second PE device, where for function implementation of the enabling module 703, refer to the related descriptions in S301.

Optionally, the first PE device and the second PE device are devices of different vendors.

Optionally, as shown in FIG. 7, the first PE device includes:
- a second determining module 704, configured to: before the first determining module determines that the DF device switches from the first PE device to the second PE device, determine that a port that is of the first PE device and that is for connecting to the CE device is faulty; determine that a port that is of the first PE device and that is for connecting to another network device is faulty; or determine that another network device is faulty, where the another network device is connected to the CE device.

In conclusion, this embodiment of this application provides the first PE device. After determining that the DF device switches to the second PE device, the first PE device may send the first packet to the second PE device, so that the second PE device can forward the first packet to the CE device connected to the two PE devices jointly. Therefore, the CE device may generate or update a MAC entry in time based on the first packet forwarded by the second PE device, and may send a packet to the second PE device based on the MAC entry. In this way, the second PE device that switches to the DF device may forward the packet from the CE device, so that normal forwarding of uplink traffic sent from the CE device can be ensured, and interruption of the uplink traffic of the CE device can be avoided.

Figure 8:
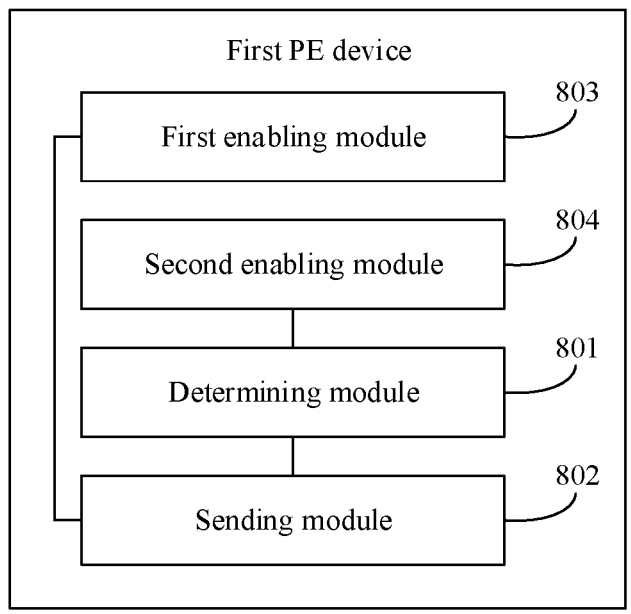
FIG. 8 is a schematic diagram of a structure of another PE device according to an embodiment of this application.

FIG. 8 is a schematic diagram of a structure of another PE device according to an embodiment of this application. The PE device is a first PE device, and the first PE device may be configured to implement the packet sending method in the method embodiment shown in FIG. 6. As shown in FIG. 8, the first PE device includes:
- a determining module 801, configured to determine that a DF device switches from a second PE device to a first PE device, where the second PE device and the first PE device are connected to a same customer edge CE device, and for function implementation of the determining module 801, refer to the related descriptions in S603; and
- a sending module 802, configured to send a first packet to the CE device based on a case in which the DF device switches from the second PE device to the first PE device, where a source MAC address of the first packet is a MAC address that is of a destination network device and that is learned by the first PE device, and for function implementation of the sending module 802, refer to the related descriptions in S604.

Optionally, the determining module 801 is further configured to: after the sending module sends the first packet to the CE device, determine that the DF device switches from the first PE device back to the second PE device, where for function implementation of the determining module 801, further refer to the related descriptions in S605.

The sending module 802 is further configured to send a second packet to the second PE device, where the second packet indicates the second PE device to send the second packet to the CE device, a source MAC address of the second packet is the MAC address of the destination network device, and for function implementation of the sending module 802, further refer to the related descriptions in S606.

Optionally, the second packet does not include an Ethernet segment identifier ESI; or the second packet includes an ESI, a value of the ESI is a special value different from an ESI of a target Ethernet segment, and the target Ethernet segment is an Ethernet segment to which a link between the first PE device and the CE device belongs.

Optionally, the first packet is a broadcast packet, and/or the second packet is a broadcast packet.

Optionally, as shown in FIG. 8, the first PE device may further include:
- a first enabling module 803, configured to: before the sending module sends the first packet to the CE device, enable, according to an obtained first instruction, a capability of sending the first packet to the CE device, where for function implementation of the first enabling module 803, refer to related descriptions in S601.

Optionally, as shown in FIG. 8, the first PE device may further include:

a second enabling module 804, configured to: before the sending module sends the second packet to the second PE device, enable, according to an obtained second instruction, a capability of sending the second packet to the second PE device, where for a function implementation of the second enabling module 804, refer to the related descriptions in S602.

Optionally, the first PE device and the second PE device are devices of different vendors; or the first PE device and the second PE device are devices of a same vendor.

In conclusion, this embodiment of this application provides the first PE device. After switching to the DF device, the first PE device may send the first packet to the CE device. Therefore, the CE device may generate or update a MAC entry in time based on the first packet forwarded by the first PE device, and may send a packet to the first PE device based on the MAC entry. In this way, the first PE device that switches to the DF device may forward the packet from the CE device, so that normal forwarding of uplink traffic sent from the CE device can be ensured, and interruption of the uplink traffic of the CE device can be avoided.

It may be clearly understood by a person skilled in the art that for the purpose of convenient and brief description, for a detailed working process of the PE device and the modules, refer to a corresponding process in the foregoing method embodiments. Details are not described herein again.

It should be understood that the PE device in this embodiment of this application may further be implemented by using an application-specific integrated circuit (ASIC) or a programmable logic device (PLD). The PLD may be a complex programmable logic device (CPLD), a field-programmable gate array (FPGA), generic array logic (GAL), or any combination thereof. Alternatively, the network access method provided in the foregoing method embodiments may be implemented by using software. When the packet sending method provided in the foregoing method embodiments is implemented by using software, the modules in the PE device may alternatively be software modules.

Figure 9:
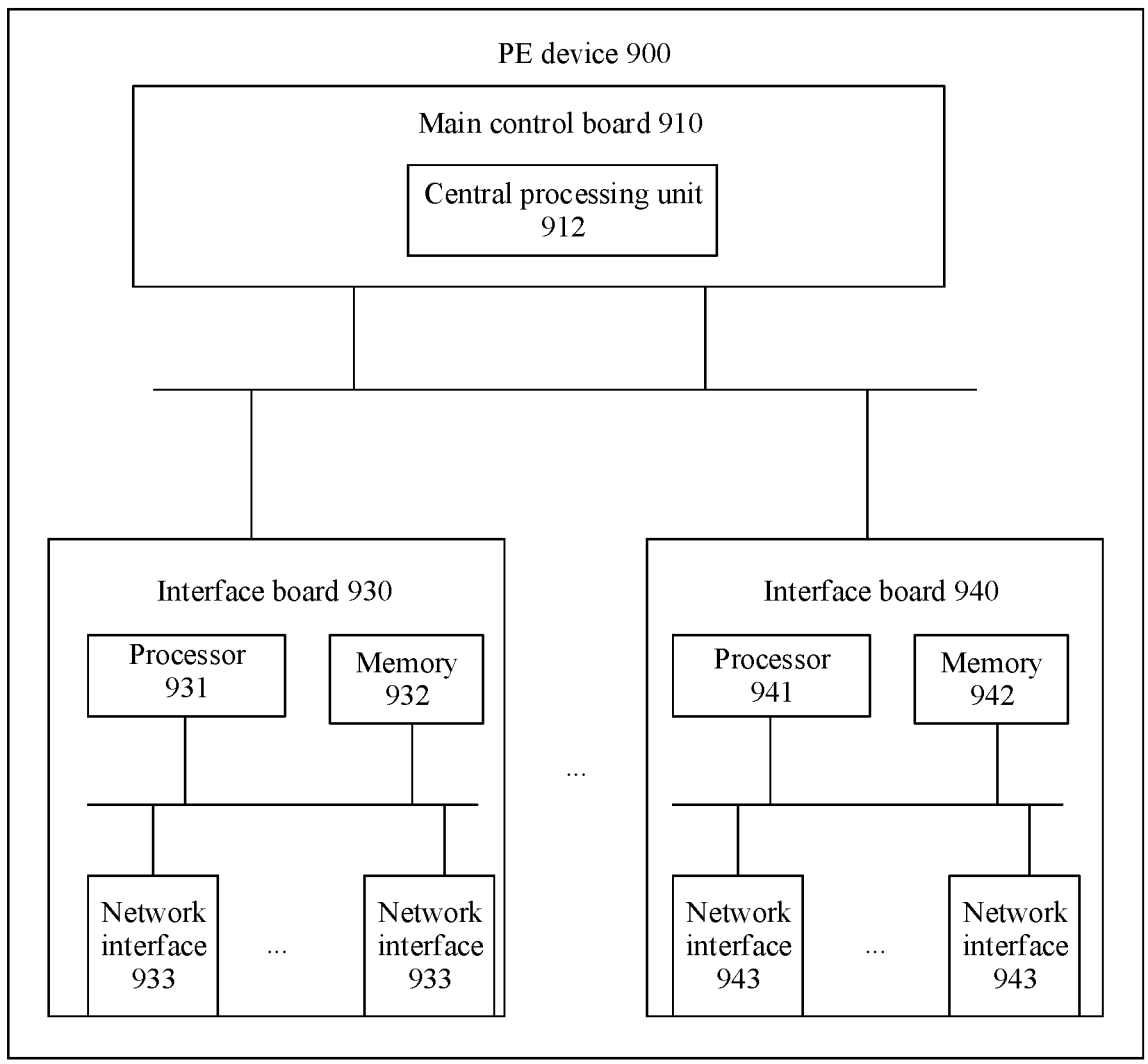
FIG. 9 is a schematic diagram of a structure of still another PE device according to an embodiment of this application.

FIG. 9 is a schematic diagram of a structure of still another PE device according to an embodiment of this application. The PE device 900 may be the first PE device in any one of the foregoing embodiments. The PE device 900 may be a switch, a router, or another network device for packet forwarding. In this embodiment, the PE device 900 includes a main control board 910, an interface board 930, and an interface board 940. When there are a plurality of interface boards, a switching board (not shown in the figure) may be included. The switching board is configured to complete data exchange between the interface boards (where the interface board is also referred to as a line card or a service board).

The main control board 910 is configured to complete functions such as system management, device maintenance, and protocol processing. The interface boards 930 and 940 are configured to provide various service interfaces (for example, a POS interface, a GE interface, and an ATM interface), and implement packet forwarding. The main control board 910 mainly includes three types of function units: a system management and control unit, a system clock unit, and a system maintenance unit. The main control board 910, the interface board 930, and the interface board 940 are connected to a platform backboard through a system bus to implement interworking. The interface board 930 includes one or more processors 931. The processor 931 is configured to: control and manage the interface board, communicate with a central processing unit on the main control board, and perform packet forwarding processing. A memory 932 on the interface board 930 is configured to store a forwarding entry, and the processor 931 performs packet forwarding by searching the forwarding entry stored in the memory 932.

The interface board 930 includes one or more network interfaces 933, configured to receive a packet sent by a previous-hop node, and send a processed packet to a next-hop node according to an indication of the processor 931. Specific implementation processes are not described one by one herein again. Specific functions of the processor 931 are not described one by one herein again either.

It may be understood that, as shown in FIG. 9, in this embodiment, the plurality of interface boards are included, and a distributed forwarding mechanism is used. In this mechanism, operations on the interface board 940 are basically similar to operations on the interface board 930. For brevity, details are not described again. In addition, it may be understood that the processor 931 on the interface board 930 and/or a processor 941 in FIG. 9 may be dedicated hardware or a chip, for example, a network processor or an application-specific integrated circuit, to implement the foregoing functions. This implementation is generally referred to as a manner of using dedicated hardware or a chip for processing on a forwarding plane. In another implementation, the processor 931 and/or the processor 941 may alternatively be a general-purpose processor, for example, a general-purpose CPU, to implement the foregoing functions.

In addition, it may be understood that there may be one or more main control boards. When there are a plurality of main control boards, a primary main control board and a secondary main control board may be included. There may be one or more interface boards, and a device having a stronger data processing capability provides more interface boards. If there are a plurality of interface boards, the plurality of interface boards can communicate with each other by using one or more switching boards, and the plurality of interface boards can jointly implement load balancing and redundancy backup. In a centralized forwarding architecture, the device may not need the switching board, and the interface board provides a function of processing service data of an entire system. In a distributed forwarding architecture, the device includes a plurality of interface boards. Data exchange between the plurality of interface boards may be implemented by using a switching board, and a large-capacity data exchange and processing capability is provided. Therefore, a data access and processing capability of the network device in the distributed architecture is better than that of the device in the centralized architecture. A specific architecture that is to be used depends on a specific networking deployment scenario. This is not limited herein.

In a specific embodiment, the memory 932 may be a read-only memory (read-only memory, ROM) or another type of static storage device that can store static information and instructions, or a random access memory (random access memory, RAM) or another type of dynamic storage device that can store information and instructions. The memory 932 may alternatively be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk or another magnetic storage device, or any other medium that can be for carrying or storing expected program code in a form of instructions or a data structure and that can be accessed by a computer.

However, the memory 932 is not limited thereto. The memory 932 may exist independently, and is connected to the processor 931 through a communication bus. Alternatively, the memory 932 and the processor 931 may be integrated together.

The memory 932 is configured to store program code, and execution is controlled by the processor 931, to perform the packet sending method provided in the foregoing embodiments. The processor 931 is configured to execute the program code stored in the memory 932. The program code may include one or more software modules. The one or more software modules may be the functional modules provided in any embodiment in FIG. 7 and FIG. 8.

In a specific embodiment, the network interface 933 may be any transceiver-type apparatus, and is configured to communicate with another device or a communication network, for example, the Ethernet, a radio access network RAN), or a wireless local area network (WLAN).

Figure 10:
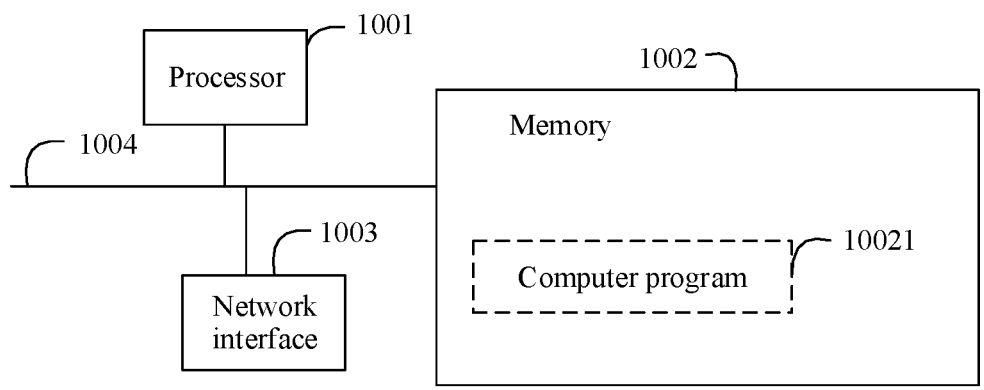
FIG. 10 is a schematic diagram of a structure of still another PE device according to an embodiment of this application.

FIG. 10 is a schematic diagram of a structure of yet another PE device according to an embodiment of this application. The PE device 1000 may be applied to the system shown in FIG. 1, FIG. 2, FIG. 4, or FIG. 5. With reference to FIG. 10, the PE device 1000 may include a processor 1001, a memory 1002, a transceiver 1003, and a bus 1004. The bus 1004 is configured to connect the processor 1001, the memory 1002, and the transceiver 1003. A communication connection to another device may be implemented through the transceiver 1003 (which may be wired or wireless). The memory 1002 stores a computer program, and the computer program is for implementing various application functions.

It should be understood that, in this embodiment of this application, the processor 1001 may be a CPU, or the processor 1001 may be another general-purpose processor, a digital signal processor (DSP), an application-specific integrated circuit (ASIC), a field-programmable gate array (FPGA), a GPU or another programmable logic device, a discrete gate or a transistor logic device, a discrete hardware component, or the like. The general purpose processor may be a microprocessor, any conventional processor, or the like.

The memory 1002 may be a volatile memory or a nonvolatile memory, or may include both a volatile memory and a nonvolatile memory. The nonvolatile memory may be a ROM, a programmable read-only memory (programmable ROM, PROM), an erasable programmable read-only memory (erasable PROM, EPROM), an EEPROM, or a flash memory. The volatile memory may be a RAM, and serves as an external cache. By way of example but not limitative description, many forms of RAMs may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

The bus 1004 may further include a power bus, a control bus, a status signal bus, and the like in addition to a data bus. However, for clear description, various types of buses in the figure are marked as the bus 1004.

The processor 1001 is configured to execute the computer program stored in the memory 1002, and the processor 1001 executes the computer program 10021 to implement the packet sending method shown in the foregoing method embodiments.

An embodiment of this application further provides a computer-readable storage medium. The computer-readable storage medium stores instructions. The instructions are executed by a processor to implement the packet sending method provided in the foregoing method embodiments.

An embodiment of this application further provides a computer program product including instructions. When the computer program product runs on a computer, the computer is enabled to perform the packet sending method provided in the foregoing method embodiments.

An embodiment of this application further provides a communication system. The communication system may be an EVPN. As shown in FIG. 1, FIG. 2, FIG. 4, and FIG. 5, the communication system may include a CE device and a PE device connected to the CE device. The PE device is the first PE device provided in the foregoing embodiments. The system may further include one or more other PE devices, and the one or more other PE devices and the PE device may belong to multihoming devices of the CE device.

For example, refer to FIG. 1. The communication system may include the CE 1 and the PE 1 and the PE 2 that are connected to the CE 1. The PE 1 or the PE 2 is the first PE device provided in the foregoing embodiments.

All or some of the foregoing embodiments may be implemented by using software, hardware, firmware, or any combination thereof. When software is used for implementation, embodiments may be implemented completely or partially in a form of a computer program product. The computer program product includes one or more computer instructions. When the computer instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer or a data storage device, for example, a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid state disk (SSD)), or the like.

The foregoing descriptions are merely optional implementations of this application, but the protection scope of this application is not limited thereto. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A packet sending method, wherein the method comprises:

determining, by a first provider edge (PE) device, that a designated forwarder (DF) device switches from the first PE device to a second PE device, wherein the second PE device and the first PE device are connected to a same customer edge (CE) device; and sending, by the first PE device, a first packet to the second PE device after a preset duration elapses after the DF device switches from the first PE device to the second PE device, wherein the first packet indicates to the second PE device to forward the first packet to the CE device, and wherein a source media access control (MAC) address of the first packet is a MAC address that is of a destination network device and that is learned by the first PE device.

2. The method according to claim 1, wherein after the sending, by the first PE device, a first packet to the second PE device, the method further comprises:
   determining, by the first PE device, that the DF device switches from the second PE device back to the first PE device; and
   sending, by the first PE device, a second packet to the CE device, wherein a source MAC address of the second packet is the MAC address of the destination network device.

3. The method according to claim 1, wherein
   the first packet comprises an Ethernet segment identifier (ESI), a value of the ESI is a special value different from an ESI of a target Ethernet segment, and the target Ethernet segment is an Ethernet segment to which a link between the first PE device and the CE device belongs.

4. The method according to claim 1, wherein at least one of the first packet is a broadcast packet, and the second packet is a broadcast packet.

5. The method according to claim 1, wherein before the sending, by the first PE device, a first packet to the second PE device, the method further comprises:
   enabling, by the first PE device according to an obtained instruction, a capability of sending the first packet to the second PE device.

6. The method according to claim 5, wherein the first PE device and the second PE device are devices of different vendors.

7. The method according to claim 1, wherein before the determining, by a first PE device, that a DF device switches from the first PE device to a second PE device, the method further comprises:
   determining, by the first PE device, one of that a port that is of the first PE device and that is for connecting to the CE device is faulty; determining, by the first PE device, that a port that is of the first PE device and that is for connecting to another network device is faulty; or that another network device is faulty, wherein the another network device is connected to the CE device.

8. The method according to claim 1, wherein the first packet does not comprise an Ethernet segment identifier (ESI).

9. A first provider edge (PE) device, wherein the first PE device comprises a non-transitory memory and a processor;
   the non-transitory memory is configured to store a computer program; and
   the processor is configured to execute the computer program stored in the memory, to cause the PE device to perform steps comprising:
   determining that a designated forwarder (DF) device switches from a second PE device to the first PE device, wherein the second PE device and the first PE device are connected to a same customer edge (CE) device; and
   sending a first packet to the CE device wherein the first pack is sent when the DF device switches from the second PE device to the first PE device, and wherein a source media access control (MAC) address of the first packet is a MAC address that is of a destination network device and that is learned by the first PE device
   determining that the DF device switches from the first PE device back to the second PE device; and
   sending a second packet to the second PE device, wherein the second packet indicates the second PE device to send the second packet to the CE device, and a source MAC address of the second packet is the MAC address of the destination network.

10. The first PE device according to claim 9, wherein at least one of the first packet is a broadcast packet, and the second packet is a broadcast packet.

11. The first PE device according to claim 9, wherein the computer program executed by the processor, further causes the first PE device to perform steps comprising:
    before sending the first packet to the CE device, enabling, according to an obtained first instruction, a capability of sending the first packet to the CE device.

12. The first PE device according to claim 9, wherein the computer program executed by the processor, further causes the first PE device to perform steps comprising:
    before sending the second packet to the second PE device, enabling, according to an obtained second instruction, a capability of sending the second packet to the second PE device.

13. The first PE device according to claim 9, wherein the first PE device and the second PE device are devices of different vendors.

14. A first provider edge (PE) device, wherein the first PE device comprises a non-transitory memory and a processor;
    the non-transitory memory is configured to store a computer program; and
    the processor is configured to execute the computer program stored in the memory, to cause the PE device to perform steps comprising:
    determining that a designated forwarder (DF) device switches from the first PE device to a second PE device, wherein the second PE device and the first PE device are connected to a same customer edge (CE) device; and
    sending a first packet to the second PE device after a preset duration elapses after the DF device switches from the first PE device to the second PE device, wherein the first packet indicates to the second PE device to forward the first packet to the CE device, and wherein a source media access control (MAC) address of the first packet is a MAC address that is of a destination network device and that is learned by the first PE device.

15. The first PE device according to claim 14, wherein the computer program executed by the processor, further causes the first PE device to perform steps comprising:
    determining that the DF device switches from the second PE device back to the first PE device; and
    sending a second packet to the CE device, wherein a source MAC address of the second packet is the MAC address of the destination network device.

16. The first PE device according to claim 14, wherein the first packet comprises an Ethernet segment identifier (ESI), a value of the ESI is a special value different from an ESI of a target Ethernet segment, and the target Ethernet segment is an Ethernet segment to which a link between the first PE device and the CE device belongs.

17. The first PE device according to claim 14, wherein at least one of the first packet is a broadcast packet, and the second packet is a broadcast packet.

18. The first PE device according to claim 14, wherein the first packet does not comprise an Ethernet segment identifier (ESI).

19. The first PE device according to claim 14, wherein the computer program executed by the processor, further causes the first PE device to perform steps comprising:
   before sending the first packet to the second PE device, enabling, according to an obtained instruction, a capability of sending the first packet to the second PE device.

20. The first PE device according to claim 14, wherein the computer program executed by the processor, further causes the first PE device to perform steps comprising:
   before determining that the DF device switches from the first PE device to the second PE device,
   determining, one of that a port that is of the first PE device and that is for connecting to the CE device is faulty;
   determining that a port that is of the first PE device and that is for connecting to another network device is faulty; or
   determining that the another network device is faulty;
   wherein the another network device is connected to the CE device.

\* \* \* \* \*